US009158435B2

(12) United States Patent
Clark et al.

(10) Patent No.: US 9,158,435 B2
(45) Date of Patent: Oct. 13, 2015

(54) SYNCHRONIZING PROGRESS BETWEEN RELATED CONTENT FROM DIFFERENT MEDIUMS

(71) Applicant: International Business Machines Corporation, Armonk, NY (US)

(72) Inventors: Adam T. Clark, Mantorville, MN (US);
Michael T. Kalmbach, Elgin, MN (US);
John E. Petri, St. Charles, MN (US);
Kevin Wendzel, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 243 days.

(21) Appl. No.: 13/842,055

(22) Filed: Mar. 15, 2013

(65) Prior Publication Data

US 2014/0281989 A1    Sep. 18, 2014

(51) Int. Cl.
*G06F 3/0484* (2013.01)
*G06F 17/30* (2006.01)

(52) U.S. Cl.
CPC ........ *G06F 3/0484* (2013.01); *G06F 17/30796* (2013.01)

(58) Field of Classification Search
CPC ... G06F 3/16; G06F 3/0481; G06F 17/30867;
G06F 17/30; G06F 17/30796; G06F 17/3082;
H04N 21/4622; G06Q 10/10
USPC ............ 715/716, 717, 744, 745; 375/E7.183,
375/E7.192; 386/239, 241, 243, 244, 248;
709/217, 219, 231; 707/E17.001,
707/E17.002, E17.009, 999.1
See application file for complete search history.

(56) References Cited

U.S. PATENT DOCUMENTS

| | | | |
|---|---|---|---|
| 6,366,296 B1 * | 4/2002 | Boreczky et al. ............. | 715/719 |
| 6,778,221 B1 | 8/2004 | Nishioka et al. | |
| 7,212,873 B1 | 5/2007 | Townsend et al. | |
| 8,356,248 B1 * | 1/2013 | Killalea ........................ | 715/273 |
| 2002/0093591 A1 * | 7/2002 | Gong et al. ................... | 348/515 |
| 2003/0072491 A1 | 4/2003 | Sirivara et al. | |
| 2006/0074861 A1 | 4/2006 | Wilensky | |
| 2006/0149781 A1 | 7/2006 | Blankinship | |
| 2007/0028183 A1 | 2/2007 | Ostojic et al. | |

(Continued)

OTHER PUBLICATIONS

U.S. Appl. No. 13/841,838, entitled Presenting Key Differences Between Related Content From Different Mediums, filed Mar. 15, 2013.

(Continued)

*Primary Examiner* — Doon Chow
*Assistant Examiner* — Wendy Nicholas
(74) *Attorney, Agent, or Firm* — Patterson & Sheridan, LLP

(57) ABSTRACT

System, method, and computer program product to resume playback between different media formats of a media title, by monitoring progress of a user consuming the media title in a first media format, differences existing between the first media format and the different media formats, responsive to the user stopping consumption of the media title in the first media format, computing a stopping point in the first media format, identifying at least one resume point for each of the different media formats, computing a similarity score for each identified resume point based on a similarity of the stopping point in the first media format and each identified resume point, and upon determining that the user has triggered an indication to consume the media title in a second media format, resuming playback of the media title at a resume point for the second media format having the highest similarity score.

20 Claims, 7 Drawing Sheets

(56) References Cited

U.S. PATENT DOCUMENTS

| | | |
|---|---|---|
| 2007/0154176 A1 | 7/2007 | Elcock et al. |
| 2007/0186163 A1 | 8/2007 | Yeh et al. |
| 2008/0243837 A1 | 10/2008 | Davis et al. |
| 2010/0030780 A1 | 2/2010 | Eshghi et al. |
| 2011/0078572 A1 | 3/2011 | Milazzo |
| 2012/0079276 A1 | 3/2012 | Evans et al. |
| 2012/0158706 A1 | 6/2012 | Story, Jr. et al. |
| 2012/0197998 A1* | 8/2012 | Kessel et al. ............... 709/205 |
| 2012/0210222 A1 | 8/2012 | Matsuda et al. |
| 2012/0210228 A1 | 8/2012 | Wang et al. |
| 2013/0074133 A1* | 3/2013 | Hwang et al. ............... 725/93 |
| 2013/0212454 A1* | 8/2013 | Casey ............... 715/203 |
| 2013/0268826 A1* | 10/2013 | Nowakowski et al. ....... 715/203 |
| 2013/0326350 A1* | 12/2013 | Roberts et al. ............... 715/716 |
| 2014/0040713 A1 | 2/2014 | Dzik et al. |
| 2014/0278360 A1 | 9/2014 | Clark et al. |
| 2014/0281982 A1 | 9/2014 | Clark et al. |

OTHER PUBLICATIONS

U.S. Appl. No. 13/841,967, entitled Presenting Key Differences Between Related Content From Different Mediums, filed Mar. 15, 2013.

* cited by examiner

SYNCHRONIZING PROGRESS BETWEEN RELATED CONTENT FROM DIFFERENT MEDIUMS

BACKGROUND

Embodiments disclosed herein relate to computer software. More specifically, embodiments disclosed herein relate to computer software that synchronizes progress between related content from different mediums.

Popular media titles are typically produced in many different formats, or mediums. For example, a literary work may be published as an audio book, electronic book, movie, video game, or a web based production. Often times, however, there are differences between the different formats. For example, the book may have several chapters that were not included as scenes in the movie, or levels in the video game. Attempts to identify these differences have heretofore been performed through a manual, hard coded annotation process in each source.

Each medium has advantages and disadvantages, and users may wish to consume related content in different ways, depending on their current situation. For example, a user may want to read an eBook before going to bed, listen to an audio book while driving, and play the video game after work.

SUMMARY

Embodiments disclosed herein provide a system, method, and computer program product to intelligently resume playback of a media title between a plurality of different media formats of the media title, by monitoring a progress of a user consuming the media title in a first media format, of the plurality of media formats, differences existing between the first media format and the plurality of different media formats, responsive to the user stopping consumption of the media title in the first media format, computing a stopping point of the user in the first media format, identifying at least one resume point for each of the plurality of different media formats, computing a similarity score for each identified resume point based on a similarity of the stopping point in the first media format and each identified resume point; and upon determining that the user has triggered an indication to consume the media title in a second media format, of the plurality of different media formats, resuming playback of the media title at a resume point for the second media format having the highest similarity score.

DETAILED DESCRIPTION

Figure 1:
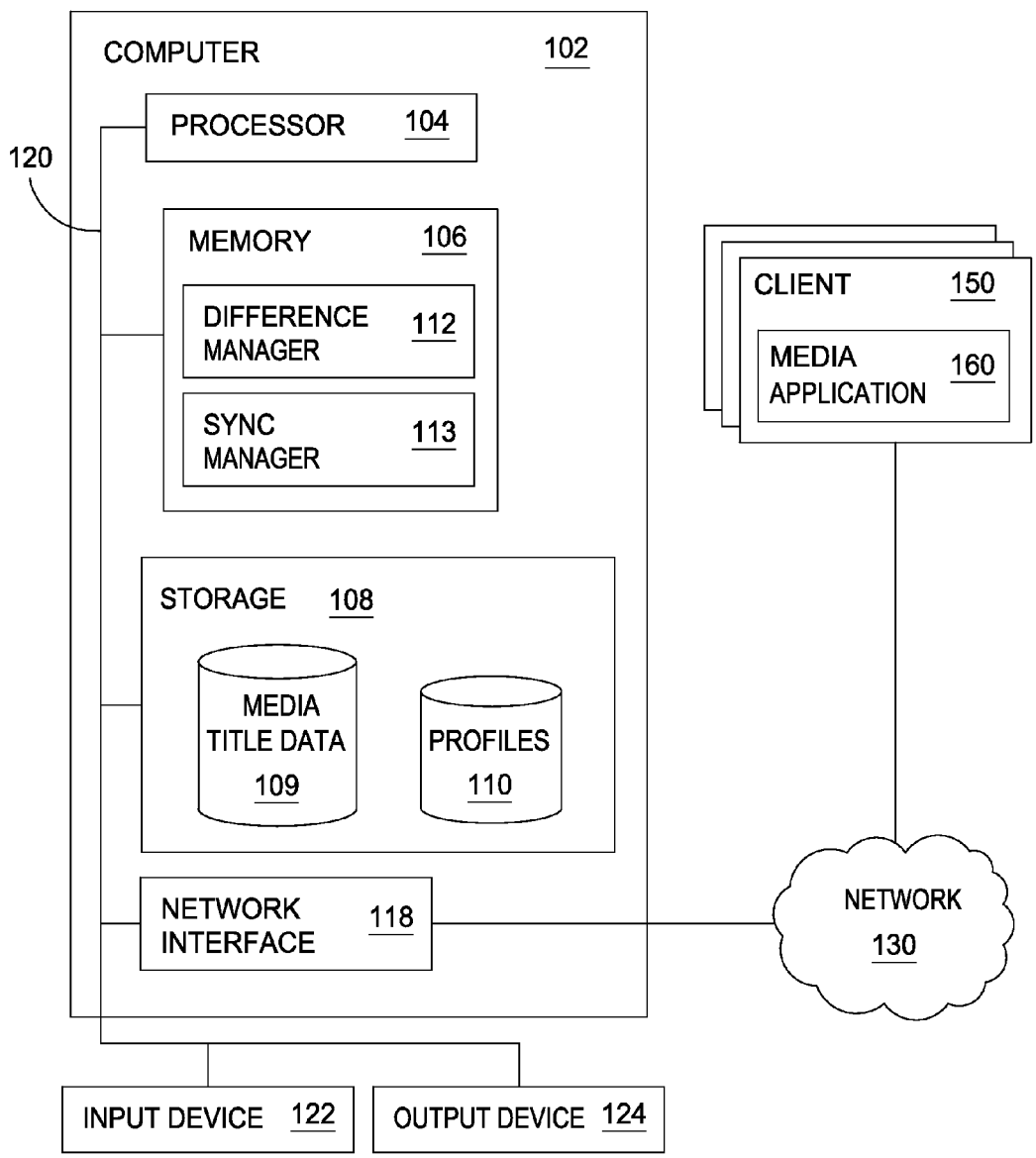
FIG. 1 is a block diagram illustrating a system to provide enhanced techniques for presenting related content from different mediums, according to one embodiment disclosed herein.

Embodiments disclosed herein relate to improved techniques in presenting similar media content to users through different mediums. As used herein, the terms "media title" or "media content" refer to creative works, including, but not limited to, books, electronic books (eBooks), audio books, movies, songs, radio programs, television shows, and video games. In many cases, media titles (media content) may be related to a common creative work, such as a novel which is converted into a number of different media formats, such as a movie and a video game. As used herein, "media formats" include the different mediums, formats, or versions, in which the media content is published and provided to users. Exemplary media formats include, but are not limited to, electronic texts, audio and/or video recordings, video games, and web content. A media title may also have different versions recorded in the same medium, such as abridged and unabridged versions of a book, or theatrical and director's cuts of a movie.

Embodiments disclosed herein analyze, for a given media title, the different media formats to identify differences between the media formats. The identified differences may be presented to a user consuming the media content in a given media format. The differences may be presented to enhance the user's experience. For example, a user watching a movie may receive an indication that the current scene was not in the book, or that a character present in current chapter of an eBook is not present in the movie. As another example, differences between two versions of the same media title in the same media format may be presented to the user, such as highlighting the differences between abridged and unabridged versions of an eBook. Because the differences are identified dynamically, embodiments disclosed herein may be effectively used against new and previously unconsumed content. Additionally, embodiments disclosed herein synchronize between the different media formats. For example, a user driving home while listening to an audio book may later pick up the eBook and continue at the stopping point reached in the car.

Embodiments disclosed herein use concept and passage matching techniques to identify the differences in content between different media formats. The differences may then be presented to a user in useful ways. For example, if the user has already seen a movie of a media title, and would like to read the eBook of the media title, embodiments disclosed herein may highlight a range of differences within the eBook in a number of different ways, such as highlighting chapters in the table of contents that were omitted in the movie, and presenting substantially different content within the chapters of the eBook. The user may choose to use these indicators to jump directly to different content, or use them to be aware of differences as they read. Conversely, if the user has already read the eBook version, and would now like to watch the movie, the major differences may be highlighted in the movie while the user watches. Similarly, if the user has watched a theatrical cut of a movie, but is now watching the director's cut of the same movie, the differences may be highlighted while the user watches the director's cut.

Additionally, supplemental information may be displayed according to context. This may be the case with a movie or audio book version of an eBook, where the former media formats typically contain less information than the more verbose eBook (which may itself have differing levels of detail, for example, in an abridged versus unabridged version). In such a scenario, embodiments disclosed herein indicate to the users those areas where the eBook goes beyond the current content. This may be accomplished in several ways, including overlays on the movie, or periphery of the movie, or through a separate app on the phone or tablet that stays in sync with the movie progress and is used to indicate differences in a less obtrusive manner (e.g., via vibration, pop up messages, etc.).

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Embodiments of the invention may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g. an amount of storage space consumed by a user or a number of virtualized systems instantiated by the user). A user can access any of the resources that reside in the cloud at any time, and from anywhere across the Internet. In context of the present invention, a user may access applications providing the functionality disclosed herein or related data available in the cloud. For example, the application could execute on a computing system in the cloud and detect differences between media formats, present the differences to a user consuming the differences, and synchronize a user's progress across media formats. In such a case, the application could detect the differences between the media formats, identify stopping points, and store the differences and stopping points at a storage location in the cloud. Doing so allows a user to access this information from any computing system attached to a network connected to the cloud (e.g., the Internet).

FIG. 1 is a block diagram illustrating a system 100 to provide enhanced techniques for presenting related content from different mediums, according to one embodiment disclosed herein. The networked system 100 includes a computer 102. The computer 102 may also be connected to other computers via a network 130. In general, the network 130 may be a telecommunications network and/or a wide area network (WAN). In a particular embodiment, the network 130 is the Internet.

The computer 102 generally includes a processor 104 connected via a bus 120 to a memory 106, a network interface device 118, a storage 108, an input device 122, and an output device 124. The computer 102 is generally under the control of an operating system (not shown). Examples of operating systems include the UNIX operating system, versions of the Microsoft Windows operating system, and distributions of the Linux operating system. (UNIX is a registered trademark of The Open Group in the United States and other countries. Microsoft and Windows are trademarks of Microsoft Corporation in the United States, other countries, or both. Linux is a registered trademark of Linus Torvalds in the United States, other countries, or both.) More generally, any operating system supporting the functions disclosed herein may be used. The processor 104 is included to be representative of a single CPU, multiple CPUs, a single CPU having multiple processing cores, and the like. Similarly, the memory 106 may be a random access memory.

The storage 108 may be a persistent storage device. Although the storage 108 is shown as a single unit, the storage 108 may be a combination of fixed and/or removable storage devices, such as fixed disc drives, solid state drives, removable memory cards or optical storage. The memory 106 and the storage 108 may be part of one virtual address space spanning multiple primary and secondary storage devices.

As shown, the memory 106 contains the difference manager 112. In one embodiment, the difference manager 112 provides a software application generally configured to identify differences in different media formats of a common media title, and present the differences to a user consuming one of the media formats of the media title. For example, the difference manager 112 may analyze an eBook and movie transcription of A Christmas Carol to detect differences between the two formats. When the user begins watching the movie, the difference manager 112 may present the differences to the user. In one embodiment, the differences may be presented when relevant based on a user progressing through the media title in one media format. The memory 106 also contains the sync manager 113, which is an application generally configured to maintain a user's progress between the different media formats. For example, if the user is reading the eBook of A Christmas Carol, turns off the eBook reader, and begins watching the movie, the sync manager 113 may send the user, through the device displaying the movie, a resume point in the movie which matches where the user left off in reading the eBook. In one embodiment, the difference manager 112 and sync manager 113 include the functionality of a deep question answering system.

As shown, storage 108 contains media title data 109, which stores a plurality of media titles, as well as data related thereto, including an indication of a set of differences between different media formats of a single media title. The different media formats of a single media title may also include different versions of the media title in the same format, such as abridged/unabridged versions of an eBook, or theatrical/director's cut of a movie. Additionally, the media title data 109 may also include transcriptions of media titles, from the plurality of different media formats. The media title data 109 may also include annotations and indexes of the transcriptions, including context and details of scenes or chapters of the media title. Furthermore, the media title data 109 may contain features, which emphasize the existence of certain characteristics which indicate a similarity between passages in the transcriptions. As shown, the storage 108 also includes the profiles 110, which is a repository for user data. The user data stored in the profiles 110 may include, but is not limited to, stop and resume points of a user for a plurality of different media formats of the same media title. The stop and resume points are not mere page numbers or timestamps, but are intelligently computed approximations of the user's progress across the different media formats, where the different media formats are not identical. Although depicted as a database, the media title data 109 and the profiles 110 may take any form sufficient to store data, including text files, xml data files, and the like.

As shown, a plurality of client computing devices $150_{1-N}$ may connect to the computer 102 via the network 130. Users of the client computing devices $150_{1-N}$ may execute a variety of media applications 160 to consume content in the media title data 109. The media applications 160 may include, but are not limited to, eBook applications, music players, video players, video game applications, and web browsers. In some embodiments, the functionality of the media application 160 may be integrated in the computer 102, whereby the functionality of the difference manager 112, the sync manager 113, and the media application 160 are consolidated. In such embodiments, the computer 102 may be, but is not limited to, an eBook reader, portable computing device, tablet, mobile phone, smart phone, home entertainment device (such as a DVD® or Blu-Ray® player), having the functionality described herein. As would be appreciated by one of ordinary skill in the art, any suitable distribution of the components described in FIG. 1 may be provided.

The input device 122 may be any device for providing input to the computer 102. For example, a keyboard and/or a mouse may be used. The output device 124 may be any device for providing output to a user of the computer 102. For example, the output device 124 may be any conventional display screen or set of speakers. Although shown separately from the input device 122, the output device 124 and input device 122 may be combined. For example, a display screen with an integrated touch-screen may be used.

Figure 2:
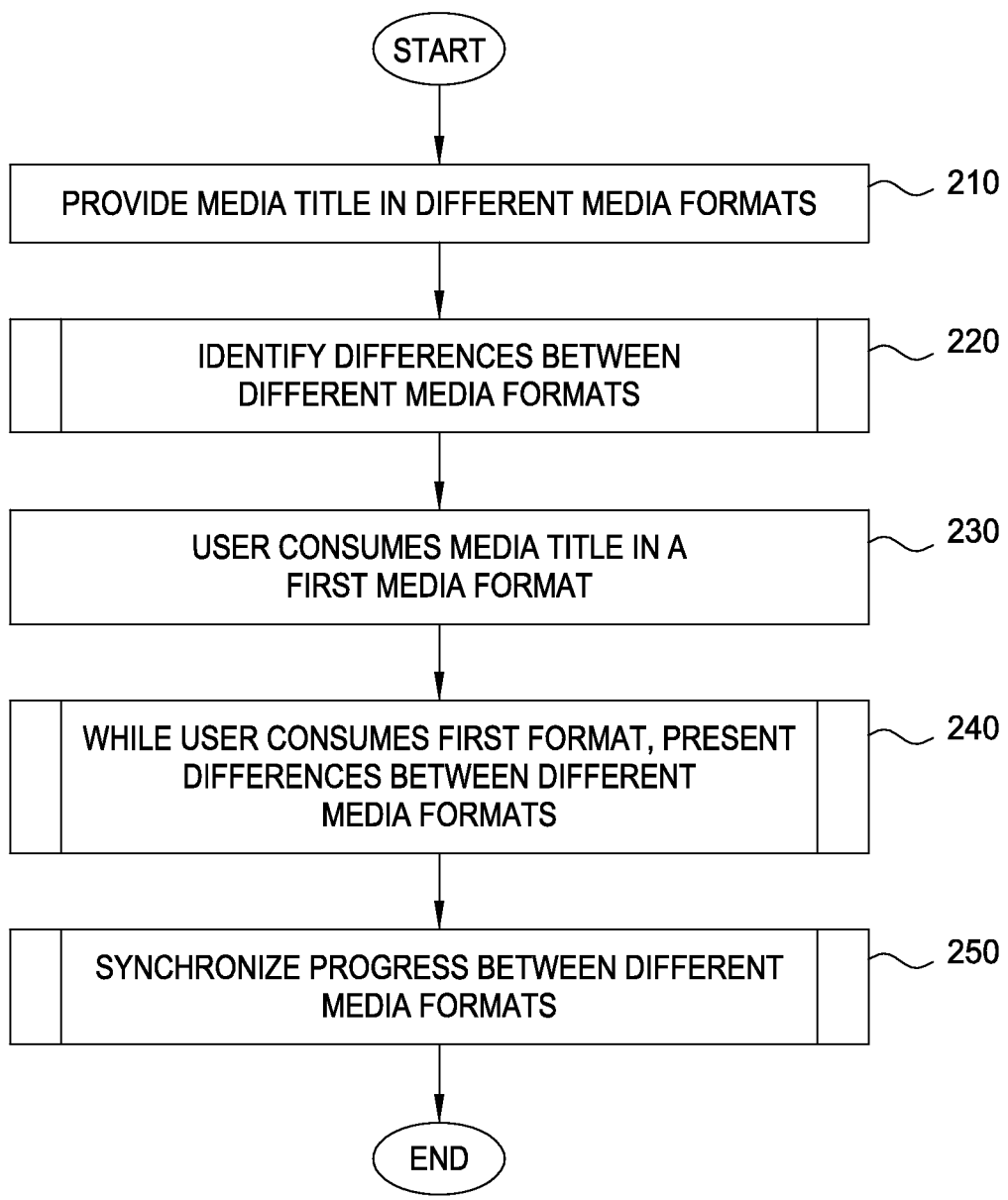
FIG. 2 is a flow chart illustrating a method for enhanced techniques of presenting related content from different mediums, according to one embodiment disclosed herein.

FIG. 2 is a flow chart illustrating a method 200 for enhanced techniques of presenting related content from different mediums, according to one embodiment disclosed herein. In one embodiment, the difference manager 112 and the sync manager 113 perform the steps of the method 200. Generally the method 200 may include the difference manager 112 dynamically identifying differences between different media formats of a single media title, the different media formats of the single media title having at least one difference. The difference manager 112 may then automatically present the identified differences to a user consuming the media title in one of the different media formats. Additionally, the sync manager 113 may also provide for seamless synchronization between media formats of a common media title when the user stops consuming one media format, and begins consuming a different media format. In one embodiment, the media formats are the same, but different versions of the media title may be analyzed, such as a theatrical cut and director's cut of the same movie.

At step 210, a media title is provided in a number of different media formats. There may exist at least one difference between each of the media formats. For example, the media title may be provided in an eBook, audio book, movie, and a video game, among other media formats. At step 220, described in greater detail with reference to FIG. 3, the difference manager 112 identifies differences between the different media formats in the media title data 109. The differences are dynamically identified by the difference manager 112 using concept and passage matching techniques to identify key missing information between the various media formats. In one embodiment, the difference manager 112 may pre-process the media formats to detect differences before a user begins consuming one of the media formats. In another embodiment, the differences are detected when the user selects one of the media formats for consumption. At step 230, a user begins consuming a media title in a first media format. For example, the user may begin reading the eBook of A Christmas Carol, or may begin watching the movie based on this novel. At step 240, while the user is consuming the media title in the first media format, the difference manager 112 may present the differences between the first media format and the other media formats of the media title. For example, if a chapter in an eBook is not in a movie, the difference manager 112 may inform the user reading the eBook that the current chapter was omitted from the movie. At step 250, the sync manager 113 synchronizes the user's progress between the different media formats of the media title. For example, if the user is reading an eBook, and stops reading at a climactic fight scene, the sync manager 113 may present the user with the option of starting the movie at the fight scene, even if the fight scenes occur in different places of the respective media format.

Figure 3:
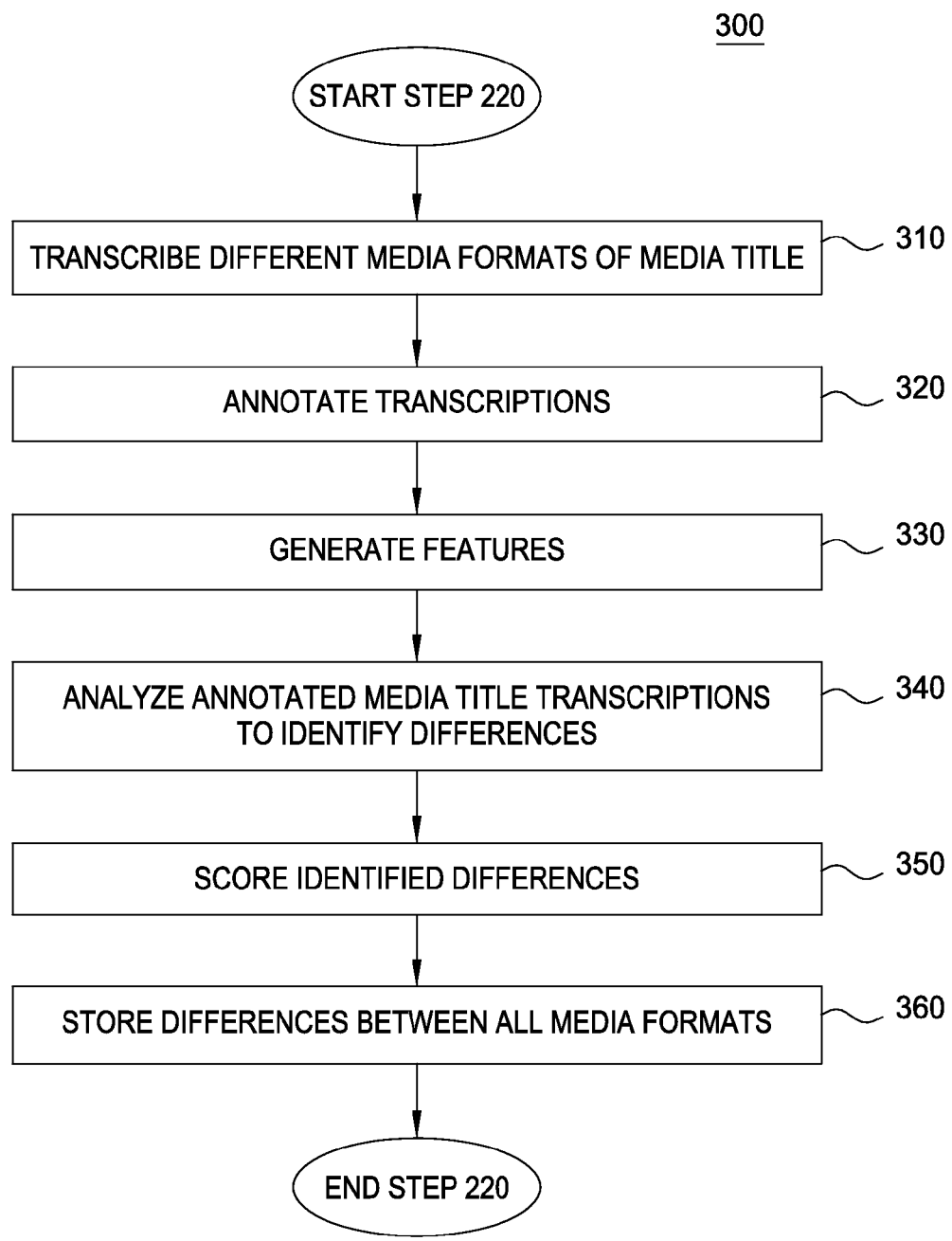
FIG. 3 is a flow chart illustrating a method to identify key differences between related content from different mediums, according to one embodiment disclosed herein.

FIG. 3 is a flow chart illustrating a method 300 corresponding to step 220 to identify key differences between related content from different mediums, according to one embodiment. In one embodiment, the difference manager 112 performs the steps of the method 300. The steps of the method 300 may be performed when a user requests to consume a media title in any given format, or the difference manager 112 may pre-process all of the titles in the media title data 109 to identify differences between the different formats of a common media title.

At step 310, the difference manager 112 transcribes the different media formats of the media title, and stores the transcriptions in the media title data 109. In one embodiment, a transcription of the dialogue may be provided to the difference manager 112, however, additional processing of that transcription may be necessary to incorporate additional detail. The transcriptions produced at step 310 include more detail than standard dialogue or voice transcriptions. The additional detail may include, but is not limited to special effects (e.g. explosions), songs being played, characters in a scene, details of the scene settings such as location, time of day, and the like. The difference manager 112, in addition to implementing speech-to-text capabilities in generating the transcriptions, may rely on closed captioning information, subtitles, or crowd-sourced annotations. By using these additional sources of information, the difference manager 112 may be able to detect, for example, the explosions or songs in a movie that go undetected by a standard voice transcription. When analyzing video, the difference manager 112 may employ facial recognition (or voice recognition) to identify actors in the movie. In such embodiments, the difference manager 112, when later detecting the same actor's face in a scene, implies that the actor's character is in the scene, even if the actor does not speak during the scene.

At step 320, the difference manager 112 may annotate the transcriptions generated at step 310. In one embodiment, the difference manager 112 may annotate the transcriptions during the transcription process. The annotations may include some of the additional information generated during the transcription process, and new information gathered by analyzing the text of the transcriptions. For example, the annotation information may include actors in a scene, time of day, and mood of music being played, all of which may be used to more intricately detail the content of a scene. The annotations are specific to the media format of the media title, and may be used to more fully describe the scenes of the movie, or chapters of the eBook, in comparison to a standard transcription. In one embodiment, the difference manager 112 may also index the annotated transcriptions, to facilitate searching between the different transcriptions.

At step 330, the difference manager 112 may generate features of the annotated transcriptions. The features may be used to identify certain characteristics in a passage which is a strong indicator of a match between passages. The difference manager 112 may produce specific non-textual (i.e. non-natural language processing) features that would allow non-text analytics to highlight similarities/differences between two media formats based on common characteristics. For example, the difference manager 112 may produce an annotation identifying that all characters in a movie scene are present in the same passage of a book. A "feature" can then detect when a certain set of annotations exist in both mediums being compared. When this feature exists, it indicates that character similarity exists, which may be of more import than strict dialogue or standard natural language matching would allow. When the feature doesn't exist, it implies a notable character that is in one media format is not in the other; a potentially noteworthy indicator. In one embodiment, this may be enough to cause the difference manager 112 to flag a difference, whereas minor variations in sentence grammar or content may not. As another example, these techniques may be used to identify the time of day within a scene. The identification algorithm used by the difference manager 112 would be different for text/audio book (analysis of words) versus a movie (analysis of video stream), but the existence of matching "TimeOfDay" features would be beneficial in discerning whether two scenes are similar.

At step 340, the difference manager 112 analyzes the annotated media title transcriptions in the media title data 109 to identify differences between different media formats of a common media title. The differences may include, but are not limited to, missing chapters/scenes, out of order chapters/scenes, chapters/scenes with varying degrees of additional or missing content, and chapters/scenes containing various degrees of supplemental crowd-sourced annotations. The differences may be identified by comparing different features, searching for matching keywords in the indexed annotations, differences in the text transcriptions, and the like. The difference manager 112 identifies the differences, where they occur, their types, and their degree of dissimilarity in comparison to other media formats. At step 350, the difference manager 112 scores the identified differences to indicate the degree of dissimilarity. The score may be based on an analysis similar to those employed by deep question answering systems, which may comprise scoring the annotated passages for dissimilarity. For example, the score may be based on English Slot Grammar (ESG) and Logical Form Answer Candidate Scorer (LFACS) analysis. At step 360, the difference manager 112 may store the difference information, including the computed scores, in the media title data 109. The difference manager 112 may perform the steps of the method 300 for all media titles having common media formats. Each media format of the common media title may be compared to all other media formats of the common media title, such that all differences across all media formats are identified.

Additionally, to support the sync manager 113, the difference manager 112 may perform the steps of the method 300 from the perspective of identifying similarities, or matches between the media content, which may then be stored in the media title data 109. To detect the similarities, the translation would be performed on the media formats of the media title, which would then be annotated and indexed for searching purposes.

Figure 4:
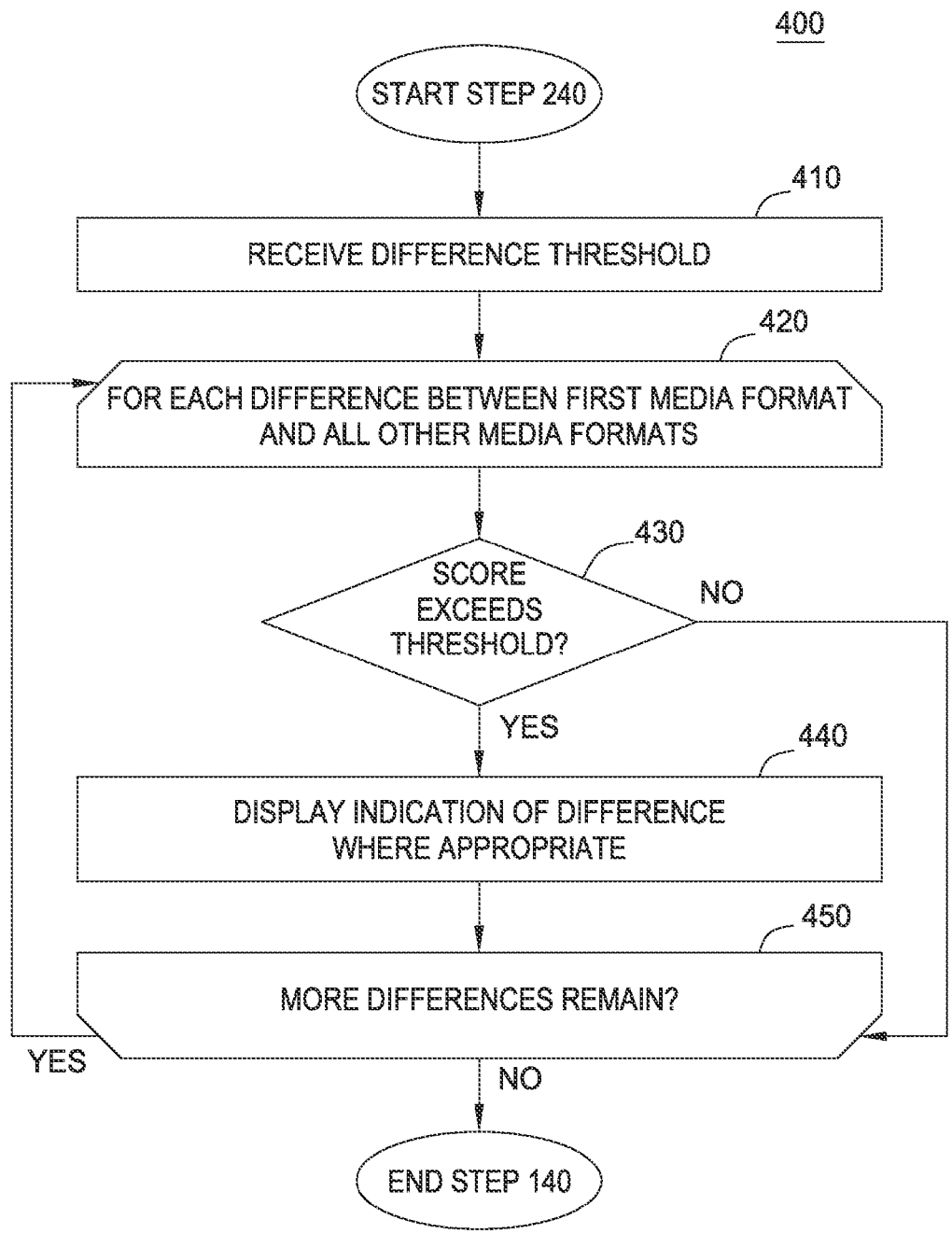
FIG. 4 is a flow chart illustrating a method to present key differences between related content from different mediums, according to one embodiment disclosed herein.

FIG. 4 is a flow chart illustrating a method 400 corresponding to step 240 to present key differences between related content from different mediums, according to one embodiment disclosed herein. In one embodiment, the difference manager 112 performs the steps of the method 400. Generally, when a user is consuming a media title in one media format, for example, watching a movie, the difference manager 112 may present the user with differences between the movie and the eBook, audio book, video games, and any other media format in which the movie has been published, while watching the movie. At step 410, the difference manager 112 receives a difference threshold. The difference threshold is used to set a threshold which the difference score of the differences must meet to be presented to the user by the difference manager 112. For example, the user may want all differences to be displayed, in which case the threshold may be set accordingly. Alternatively, the user may wish to see only the most extreme differences, such as omitted scenes, and the threshold may be set accordingly. The difference threshold may be predefined, or it may be set by a user. The difference threshold set by a user may be stored in the profiles 111.

At step 420, the difference manager 112 begins executing a loop containing steps 430-450 for each difference between a first media format (being consumed by the user) and all other media formats of the media title. At step 430, the difference manager 112 determines whether the difference score of the current difference exceeds the difference threshold. If the difference score does not exceed the threshold, it will not be presented to the user, and the difference manager 112 proceeds to step 450. If the difference score for the difference exceeds the threshold, the difference manager 112 proceeds to step 440, where the difference manager 112 displays an indication of the difference where appropriate. For example, a note may be presented to the user while reading an eBook that the current chapter lacks a character present in the movie. As another example, while watching a movie, the user may be notified by a popup icon that the current scene was not in the eBook or the audio book. Generally, any suitable method may be used to present the user with the indication of the difference, which may vary across different media formats. The indication may be provided in advance, when the user begins consuming the media title in the first media format (such as a table of contents), or as the user encounters the appropriate location within the media format (such as during a movie or within a chapter of the eBook). At step 450, the difference manager 112 determines whether more differences remain. If more differences remain, the difference manager 112 returns to step 420. Otherwise, the method 400 ends.

Figure 5A:
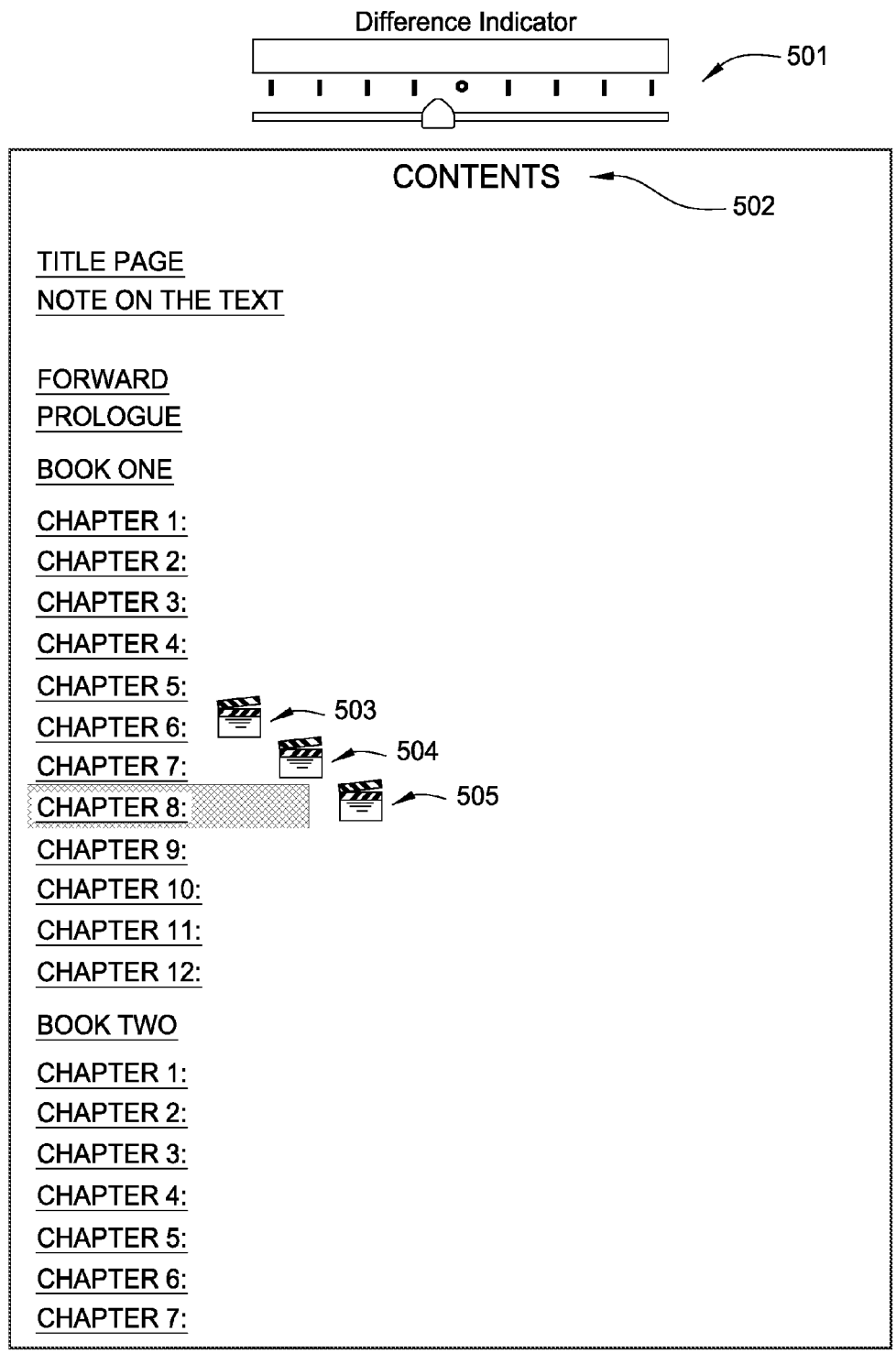
FIGS. 5A-B illustrate a graphical user interface to present key differences between related content from different mediums, according to one embodiment disclosed herein.

FIG. 5A illustrates a graphical user interface (GUI) 500 to present key differences between related content from different mediums, according to one embodiment disclosed herein. As shown, the GUI 500 is a depiction of a screen on an eReader used to display eBooks which may be read by a user. The GUI 500 includes a difference indicator 501, which allows the user to provide input to set the difference threshold discussed above. The contents frame 502 depicts a table of contents of the eBook, which has been augmented to provide the user with information regarding the differences between the eBook and the movie of the same media title. As shown, icons 503-505 have been placed next to chapters 6, 7, and 8, respectively. The icons may be clicked by the user to display additional information, such as whether the chapter was omitted in the movie, or whether certain characters from the movie scene are not in the chapter of the book. The chapters have also been highlighted differently, indicating the varying degrees of difference. The GUI 500 is merely exemplary, as any number of different presentations of differences may be provided to the user. For example, in the eBook setting, the differences may be presented in the text of the chapters. In a movie, a title screen similar to the GUI 500 may be presented with a listing of scenes, and the differences across media formats. In an audio book, additional information may be provided to the user at any point during playback.

Figure 5B:
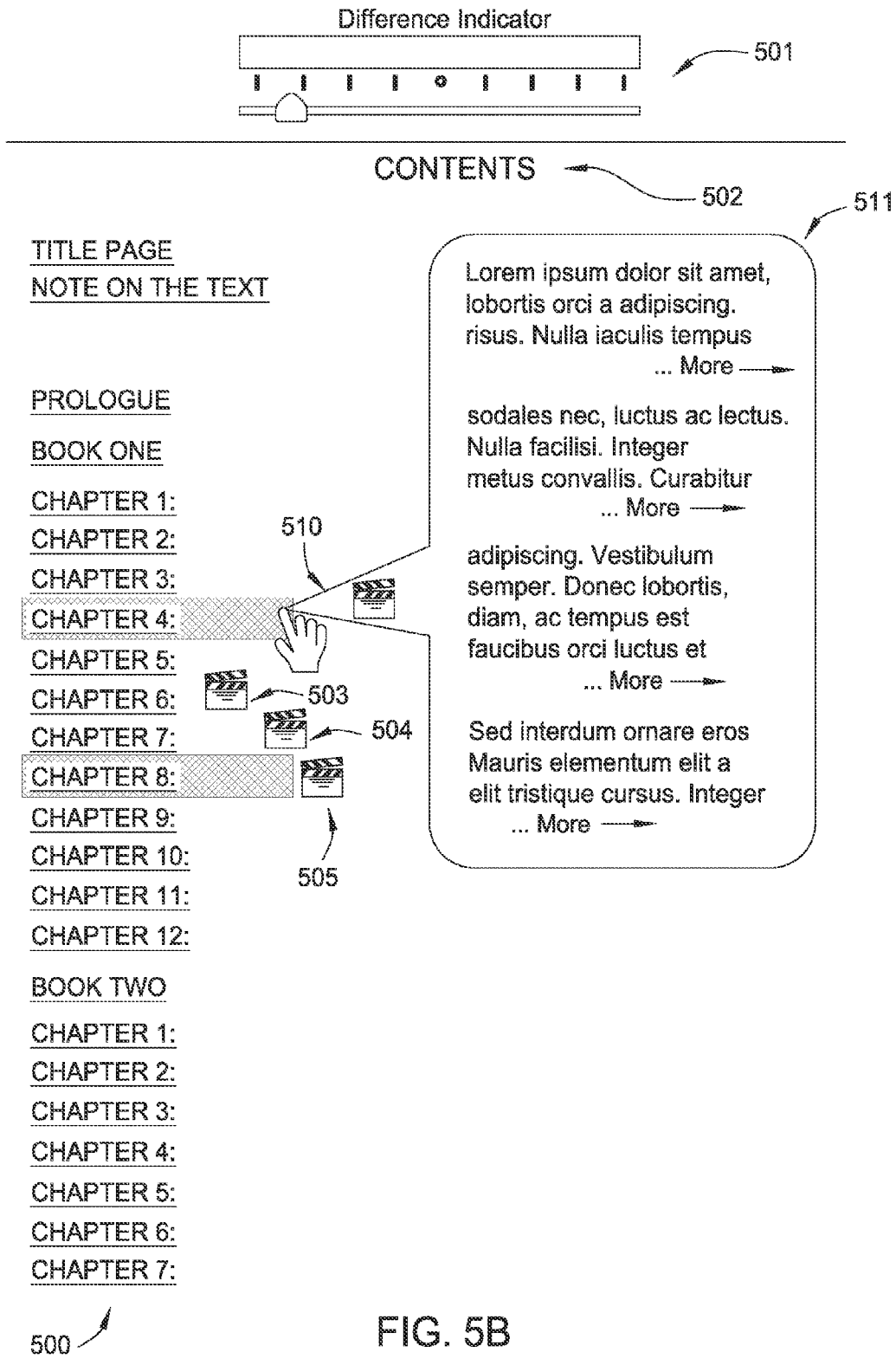

FIG. 5B illustrates the graphical user interface 500 to present key differences between related content from different mediums, according to one embodiment disclosed herein. As shown, the user has modified the position of the difference indicator 501, indicating that the user would like to receive differences having a lower difference score. As such, chapter 4 has now been provided an indication 510 of the differences, along with corresponding shading. As shown, dialogue box 511 has been presented to the user, which provides details as to the differences of the media formats, as well as links to access more information. As in FIG. 5A, chapters 6-8 are still provided with icons 503-505 to indicate the differences detected by the difference manager 112.

Figure 6:
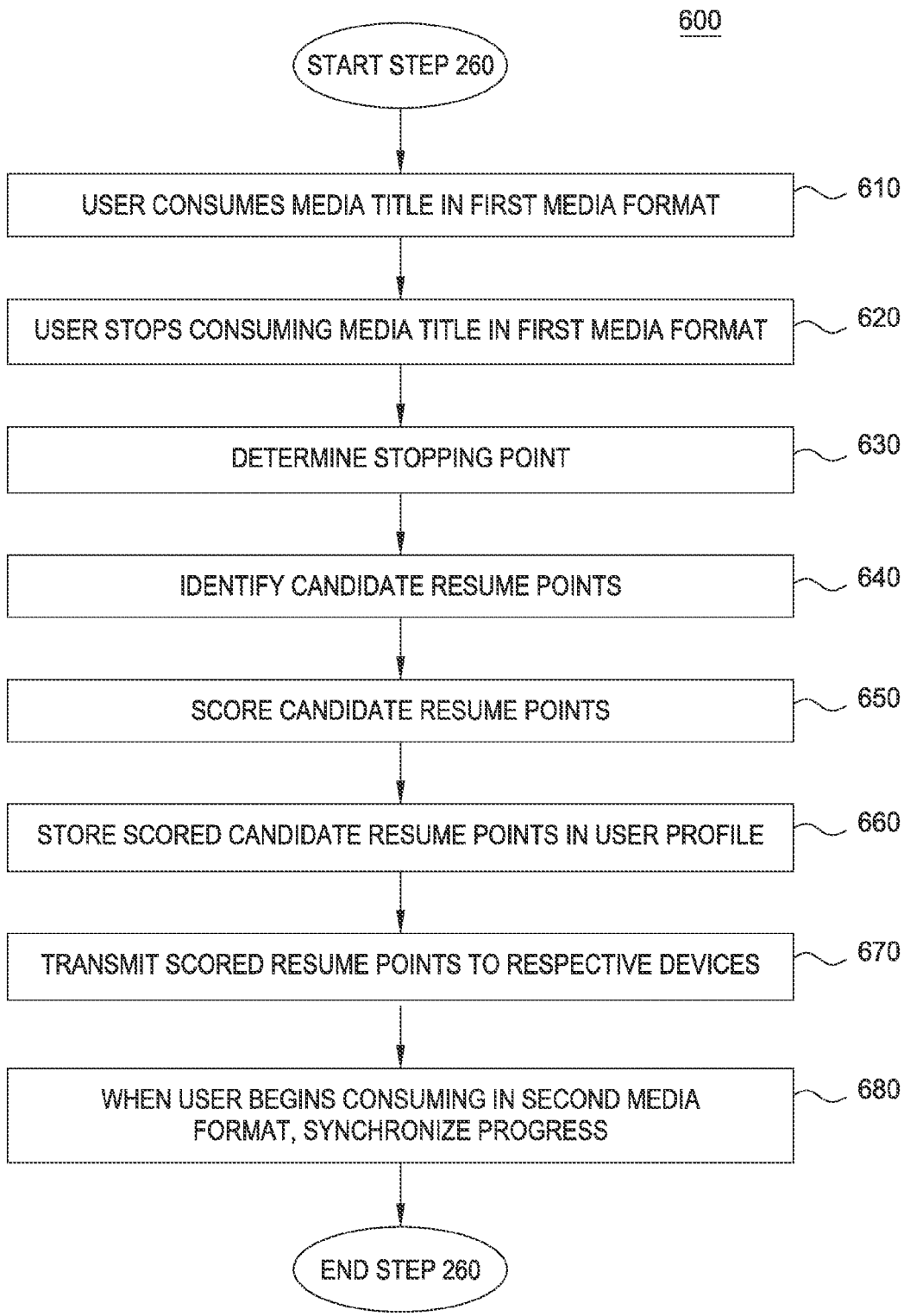
FIG. 6 is a flow chart illustrating a method to synchronize progress between related content from different mediums, according to one embodiment disclosed herein.

FIG. 6 is a flow chart illustrating a method 600 corresponding to step 250 to synchronize progress between related content from different mediums, according to one embodiment. The steps of the method 600, performed by the sync manager 113, may allow a user to consume a first part of a media title in a first format and seamlessly consume a second part of the media title in a second format. For example, the user may start reading an eBook, stop reading at a certain point and then start listening to the audio book of the same title at approximately the same place (contextually) where they left off, and vice versa. The sync manager 113 may approximate the state or progress between different media formats based on context of each media format, and concept matching (i.e., understanding) between those media formats. The sync manager 113 may utilize the indexed similarity information generated by utilizing the steps of the method 300, which, as discussed above, may be used to annotate and index transcriptions to identify similarities between the different media formats.

At step 610, a user consumes a media title in a first media format. For example, the user may begin reading an eBook, or watching a movie of the media title. The different media formats (e.g., eBook, movie, audio book, etc.) of the media title may have at least one difference, such as omitted chapters/scenes, different ordering of chapters/scenes, and the like. At step 620, the user stops consuming the media title in the first media format. The stop may be determined in a number of ways, including, but not limited to, eye tracking, exiting a vehicle or location, or powering off the device. Once the user has stopped consuming the media title in the first media format, the sync manager 113 determines a stopping point at step 630. Determining a stopping point involves figuring out approximately where the user "left off" in the first media format by gathering the current context of the first media format. The stopping point may be very precise, such as a specific sentence of an eBook, or may be coarser, such as the beginning/end of a page based on reading history (i.e., how far along the user may be in a given page based on their past reading habits). Gathering the current context may then involve capturing a certain amount of text and data surrounding the stopping point. The sync manager 113 gathers enough data in order to determine where the user would be if they were to start consuming the media title in a different media format. The data may include, but is not limited to, scene information, character information, context, time of day, music, and mood.

At step 640, the sync manager 113 may identify a number of candidate resume points. The candidate resume points may be any span of the media formats, including, but not limited to a word, sentence, scene, chapter, or any part of the media format with any level of specificity. In one embodiment, the sync manager 113 identifies the candidate resume points based by using the context data to perform a keyword search across the text indices of the different media formats in the media title data 109. As described above, the indexed transcriptions stored in the media title data 109 are more robust than basic voice/dialogue transcriptions, as they include other data, such as closed captioning, subtitles, and crowd sourced annotations, such that special effects and music can be included in the transcriptions. When a context keyword search returns a match, the sync manager 113 may identify the position associated with the keyword in the different media format as a candidate resume point. At step 650, the sync manager 113 scores the candidate resume points by conducting a deeper analysis of the candidate resume points. In one embodiment, scoring the candidate resume points may include conducting an analysis similar to those employed by deep question answering systems, such as English Slot Grammar (ESG) and Logical Form Answer Candidate Scorer (LFACS). Once the candidate resume points are scored, they may be ranked in order according to the score. By scoring the different candidate resume points, the sync manager 113 addresses the situation where a single stopping point translates to several candidate resume points in a given media format. The candidate resume points may be scored with varying confidence and presented to the user as such. At step 660, the candidate resume points may be stored as data in the user's profile in the profiles 110. At step 670, the sync manager 113 may transmit the scored resume points to the various devices through which the user consumes the various media formats. As may be appreciated by one of ordinary skill in the art, a single device may be used to consume a variety of media formats by executing applications tailored to output the respective media formats.

At step 680, the user may begin consuming the media title in a second media format, and the sync manager 113 synchronizes the user's progress, allowing the user to resume in the second media format where they left off in the first media format. In one embodiment, the user may be presented with the ranked ordering of scored candidate resume points, and the user may select the most appropriate one. In still another embodiment, a resume threshold may be implemented, such that if the score of a candidate resume point exceeds the threshold, the candidate resume point is automatically chosen for the user by the sync manager 113. In still another embodiment, the resume threshold and candidate list may be combined, such that the user is presented a list of scored candidate resume points if no scores exceed the resume threshold. In addition, the sync manager 113 may inform the user of any irregularities between the media formats, such as omitted chapters/scenes, or chapters/scenes that are out of order. The steps of the method 600 may be repeated as the user continues to use various media formats to consume the media title.

Advantageously, embodiments disclosed herein provide improved techniques to enhance a user's consumption of media titles that have been published in multiple different media formats. The differences and similarities between the media formats may be identified and stored on the user's devices, or in a storage location in the cloud. The differences (and similarities) may be presented to the user as they consume the different media formats of the media title. Additionally, the user's progress may be monitored across all media formats, allowing for seamless transitions between media formats when consumption of a first media format ceases and consumption of a second media format begins.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the foregoing is directed to embodiments of the present invention, other and further embodiments of the invention may be devised without departing from the basic scope thereof, and the scope thereof is determined by the claims that follow.

What is claimed is:

1. A system, comprising:
one or more computer processors; and
a memory containing a program, which, when executed by the one or more computer processors, performs an operation to resume playback of a media title between a plurality of different media formats of the media title, the operation comprising:
monitoring a progress of a user consuming the media title in a first media format, of the plurality of media formats, wherein differences exist between the first media format and the plurality of different media formats, wherein each of the plurality of media formats is associated with a respective set of indexed annotations generated based on a transcription of the respective media format;

responsive to the user stopping consumption of the media title in the first media format, computing a stopping point of the user in the first media format;

identifying at least one resume point for each of the plurality of different media formats based on: (i) matches between the set of indexes of the first media format and the set of indexes of the plurality of different media formats, and (ii) a first feature of the media title in the first media format matching a respective first feature of the media title in each of the plurality of different media formats;

computing a similarity score for each identified resume point based on a similarity of the stopping point in the first media format and each identified resume point;

upon determining that the user has triggered an indication to consume the media title in a second media format, of the plurality of different media formats, resuming playback of the media title at a resume point for the second media format having the highest similarity score.

2. The system of claim 1, wherein user selection of the resume point for the second media format is received prior to resuming playback of the media title at the resume point for the second media format.

3. The system of claim 1, the operation further comprising:
presenting: (i) the identified at least one resume point, and (ii) the respective at least one similarity score, of the second media format, to the user for selection; and
responsive to receiving user selection of a presented resume point, resuming playback of the media title at the selected resume point of the second media format.

4. The system of claim 1, wherein the stopping point is further identified based on: (i) a current position of the first media format, (ii) a computed context of the media title surrounding the current position in the first media format, (iii) a consumption history of the user, and (iv) a text of the media title at the current position in the first media format.

5. The system of claim 1, wherein identifying the at least one resume point for each of the plurality of different media formats comprises:
identifying a keyword associated with a context of the stopping point;
searching an indexed version of an annotated text of the respective different media formats; and
returning each resume point in the respective different media formats sharing the keyword.

6. The system of claim 1, the operation further comprising:
upon determining that a first resume point of the second media format is out of order relative to an ordering of the first media format, notifying the user that the first resume point is out of order.

7. The system of claim 1, wherein the similarity of the stopping point in the first media format and each identified resume point is based on: (i) a similarity of a computed context of the identified resume point and a computed context of the stopping point, (ii) a similarity of a text of the identified resume point and a text of the stopping point, (iii) a number of common characters shared between the identified resume point and the stopping point, and (iv) the first feature of the media title in the first media format matching the respective first feature of the media title in each of the plurality of different media formats.

8. The system of claim 1, wherein the first media format is presented on a first device, the operation further comprising:
storing the identified resume points; and
transmitting the resume point for the second media format having the highest similarity score to a device outputting the second media format.

9. A computer program product comprising:
a non-transitory computer-readable storage medium having computer-readable program code embodied therewith, the computer-readable program code executable by a processor to perform an operation to resume playback of a media title between a plurality of different media formats of the media title, the operation comprising:
monitoring a progress of a user consuming the media title in a first media format, of the plurality of media formats, wherein differences exist between the first media format and the plurality of different media formats, wherein each of the plurality of media formats is associated with a respective set of indexed annotations generated based on a transcription of the respective media format;
responsive to the user stopping consumption of the media title in the first media format, computing a stopping point of the user in the first media format;
identifying at least one resume point for each of the plurality of different media formats, formats based on: (i) matches between the set of indexes of the first media format and the set of indexes of the plurality of different media formats, and (ii) a first feature of the media title in the first media format matching a respective first feature of the media title in each of the plurality of different media formats;
computing a similarity score for each identified resume point based on a similarity of the stopping point in the first media format and each identified resume point; and
upon determining that the user has triggered an indication to consume the media title in a second media format, of the plurality of different media formats, resuming playback of the media title at a resume point for the second media format having the highest similarity score.

10. The computer program product of claim 9, wherein user selection of the resume point for the second media format is received prior to resuming playback of the media title at the resume point for the second media format.

11. The computer program product of claim 9, further comprising:
presenting: (i) the identified at least one resume point, and (ii) the respective at least one similarity score, of the second media format, to the user for selection; and
responsive to receiving user selection of a presented resume point, resuming playback of the media title at the selected resume point of the second media format.

12. The computer program product of claim 9, wherein the stopping point is further identified based on: (i) a current position of the first media format, (ii) a computed context of the media title surrounding the current position in the first media format, (iii) a consumption history of the user, and (iv) a text of the media title of at the current position in the first media format.

13. The computer program product of claim 9, wherein identifying the at least one resume point for each of the plurality of different media formats comprises:
identifying a keyword associated with a context of the stopping point;
searching an indexed version of an annotated text of the respective different media formats; and returning each resume point in the respective different media formats sharing the keyword.

14. The computer program product of claim 9, the operation further comprising:
upon determining that a first resume point of the second media format is out of order relative to an ordering of the first media format, notifying the user that the first resume point is out of order.

15. The computer program product of claim 9, wherein the similarity of the stopping point in the first media format and each identified resume point is based on: (i) a similarity of a computed context of the identified resume point and a computed context of the stopping point, (ii) a similarity of a text of the identified resume point and a text of the stopping point, (iii) a number of common characters shared between the identified resume point and the stopping point, and (iv) the first feature of the media title in the first media format matching the respective first feature of the media title in each of the plurality of different media formats.

16. The computer program product of claim 9, wherein the first media format is presented on a first device, the operation further comprising:
storing the identified resume points for each of the plurality of different media formats; and
transmitting the resume point for the second media format having the highest similarity score to a device outputting the second media format.

17. The system of claim 1, the operation further comprising: computing a context of the first media format of the media title at the stopping point, wherein the context comprises a keyword, wherein the at least one resume point for each of the plurality of different media formats is identified based on the keyword matching a first index of the set of indexes of the plurality of different media formats.

18. A method to resume playback of a media title between a plurality of different media formats of the media title, the method comprising:
monitoring a progress of a user consuming the media title in a first media format, of the plurality of media formats, wherein differences exist between the first media format and the plurality of different media formats, wherein each of the plurality of media formats is associated with a respective set of indexed annotations generated based on a transcription of the respective media format;
responsive to the user stopping consumption of the media title in the first media format, computing a stopping point of the user in the first media format;
identifying at least one resume point for each of the plurality of different media formats based on:
(i) matches between the set of indexes of the first media format and the sets of indexes of the plurality of different media formats, and (ii) a first feature of the media title in the first media format matching a respective first feature of the media title in each of the plurality of different media formats;
computing a similarity score for each identified resume point based on a similarity of the stopping point in the first media format and each identified resume point;
upon determining that the user has triggered an indication to consume the media title in a second media format, of the plurality of different media formats, resuming playback of the media title at a resume point for the second media format having the highest similarity score.

19. The method of claim 18, wherein user selection of the resume point for the second media format is received prior to resuming playback of the media title at the resume point for the second media format, the method further comprising:
presenting: (i) the identified at least one resume point, and (ii) the respective at least one similarity score, of the second media format, to the user for selection; and
responsive to receiving user selection of a presented resume point, resuming playback of the media title at the selected resume point of the second media format.

20. The method of claim 18, wherein the stopping point is further identified based on: (i) a current position of the first media format, (ii) a computed context of the media title surrounding the current position in the first media format, (iii) a consumption history of the user, and (iv) a text of the media title at the current position in the first media format, wherein the similarity of the stopping point in the first media format and each identified resume point is based on: (i) a similarity of a computed context of the identified resume point and a computed context of the stopping point, (ii) a similarity of a text of the identified resume point and a text of the stopping point, (iii) a number of common characters shared between the identified resume point and the stopping point, and (iv) the first feature of the media title in the first media format matching the respective first feature of the media title in each of the plurality of different media formats.

\* \* \* \* \*